(12) United States Patent
Tai et al.

(10) Patent No.: US 10,503,473 B1
(45) Date of Patent: Dec. 10, 2019

(54) FLOATING-POINT DIVISION ALTERNATIVE TECHNIQUES

(71) Applicant: Apple Inc., Cupertino, CA (US)

(72) Inventors: Anthony Y. Tai, San Jose, CA (US);
Liang-Kai Wang, Austin, TX (US);
Luc R. Semeria, Palo Alto, CA (US);
Xiao-Long Wu, Austin, TX (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 15/993,024

(22) Filed: May 30, 2018

(51) Int. Cl.
*G06F 7/487* (2006.01)
*G06F 9/30* (2018.01)

(52) U.S. Cl.
CPC .......... *G06F 7/4873* (2013.01); *G06F 7/4876* (2013.01); *G06F 9/30018* (2013.01); *G06F 9/30025* (2013.01)

(58) Field of Classification Search
None
See application file for complete search history.

(56) References Cited

U.S. PATENT DOCUMENTS

| | | | | |
|---|---|---|---|---|
| 5,012,438 A * | 4/1991 | Yamaguchi | ............. | G06F 1/035 708/654 |
| 5,515,308 A | 5/1996 | Karp et al. | | |
| 5,563,818 A | 10/1996 | Agarwal et al. | | |
| 5,631,859 A * | 5/1997 | Markstein | ............... | G06F 7/483 708/204 |
| 5,671,170 A | 9/1997 | Markstein et al. | | |
| 6,330,000 B1 * | 12/2001 | Fenney | .................. | G06T 15/04 345/586 |
| 8,140,608 B1 * | 3/2012 | Juffa | ....................... | G06F 7/535 708/650 |
| 8,429,217 B2 * | 4/2013 | Schmookler | ............ | G06F 7/535 708/495 |
| 8,938,485 B1 * | 1/2015 | Vanderspek | ............ | G06F 7/535 708/650 |
| 9,552,189 B1 * | 1/2017 | Langhammer | .......... | G06F 7/483 |
| 2010/0281087 A1 * | 11/2010 | Powell | .................. | G06F 7/5375 708/209 |

OTHER PUBLICATIONS

Alan H. Karp and Peter Markstein, "High Precision Division and Square Root," 26 pages, Journal, ACM Transactions on Mathematical Software (TOMS), vol. 23 Issue 4, Dec. 1997.

* cited by examiner

*Primary Examiner* — Michael D. Yaary
(74) *Attorney, Agent, or Firm* — Kowert, Hood, Munyon, Rankin & Goetzel, P.C.

(57) ABSTRACT

Techniques are disclosed relating to circuitry configured to perform reciprocal-based floating-point division. In some embodiments, floating-point circuitry includes reciprocal circuitry configured to generate a reciprocal of a divisor, multiplication circuitry configured to multiply the reciprocal results with a dividend, and circuitry configured to clear a least significant bit of an integer representation of the multiplication output to generate a modified multiplication output. The floating-point circuitry may be configured to convert the modified multiplication output to a representation using the first precision to generate a division output. In some embodiments, the refinement using the integer representation may provide correctly-rounded subnormal division results. The disclosed techniques may improve accuracy, reduce processing time, and/or reduce instructions needed for floating-point division, with little to no increase in chip area.

20 Claims, 6 Drawing Sheets

```
                              ┌──────────────────────────────────────────────────────────┐
                              │ Determine a reciprocal of a second operand to generate a │
                              │ reciprocal output, using a second floating-point         │
                              │ precision that is greater than a first floating-         │
                              │ point precision in which the second operand is represented│
                              │                           410                            │
                              └──────────────────────────────────────────────────────────┘
```

Determine a reciprocal of a second operand to generate a reciprocal output, using a second floating-point precision that is greater than a first floating-point precision in which the second operand is represented
410

Multiply the reciprocal output by a first operand, using the second precision, to generate a multiplication output
420

Clear a least significant bit of an integer representation of the multiplication output to generate a modified multiplication output
430

Convert the modified multiplication output to a representation using the first precision to generate a division output
440

FLOATING-POINT DIVISION ALTERNATIVE TECHNIQUES

BACKGROUND

Technical Field

This disclosure relates generally to floating-point circuitry and more particularly to circuitry configured to perform floating-point division using a reciprocal.

Description of the Related Art

Speaking generally, floating-point division operations use a larger number of clock cycles relative to floating-point multiplication operations. Floating point division circuitry may consume substantial area, power, and processing time. Therefore, it may be more efficient to multiply the dividend by the reciprocal of the divisor instead of performing an actual division. This may introduce rounding errors for certain ranges of values, however.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "floating-point unit configured to perform division operations" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Exemplary Reciprocal Techniques for Floating Point Division

Figure 1:
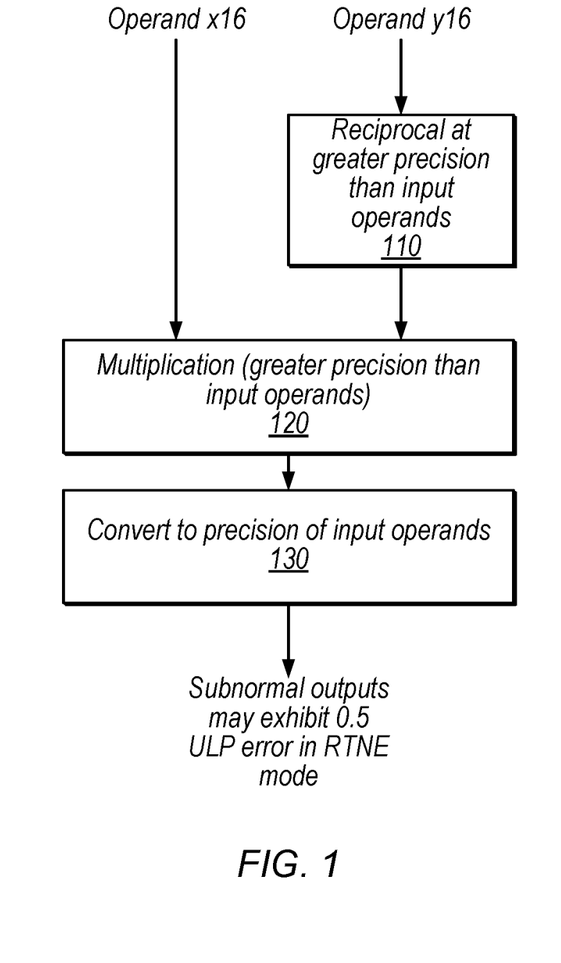
FIG. 1 is a diagram illustrating an exemplary technique for reciprocal-based floating-point division, according to some embodiments.

FIG. 1 is a diagram illustrating an exemplary process for performing floating-point division using a reciprocal function, according to some embodiments. In the illustrated example, x16 is a 16-bit dividend and y16 is a 16-bit divisor. Therefore, the desired output is x16 divided by y16. Note that various precisions (e.g., 16-bit and 32-bit) are discussed herein for purposes of illustration, but these precisions are not intended to limit the scope of the present disclosure. In other embodiments, similar techniques may be used with any of various different appropriate floating-point precisions.

At 110, in the illustrated embodiment, floating-point circuitry determines the reciprocal of y16 at a greater precision than the input operands (at a 32-bit precision for this example). In some embodiments, the output of this operation is 1/y16, at a greater precision than used to represent y16. For example, this operation may be indicated by the following pseudocode, where Y32 is a 32-bit representation of y16 and Rcp32 is the 32-bit reciprocal of Y32:

Y32=(float) y16;
Rcp32=1.0f/Y32;

At 120, in the illustrated embodiment, floating-point circuitry multiplies x16 with the output of the reciprocal function. In the illustrated embodiment, the multiplication is performed at a greater precision than the input operands (e.g., 32-bit multiplication for 16-bit input operands). For example, this operation may be indicated by the following pseudocode, where X32 is a 32-bit version of x16 and R is the product of X32 and Rcp32:

X32=(float) x16;
R=X32*Rcp32;

At 130, in the illustrated embodiment, circuitry converts the multiplication result to the precision of the input operands. This operation may be indicated by the instruction "r16=(half) R;" for example. In some embodiments, this down-conversion may use RTNE after ignoring the least-significant bit of the larger precision.

In some embodiments, the technique of FIG. 1 provides a correctly rounded result for most inputs (e.g., for a round to nearest even (RTNE) rounding mode). When the division result is a subnormal number, however, the technique of FIG. 1 may have a rounding error for some results (e.g., a 0.5 unit in last place (ULP) error). It may be desirable to correct this error in an efficient manner, e.g., in terms of performance and chip area. Note that subnormal numbers (also referred to as denormal numbers) are numbers, represented using a floating-point format, that have leading zeros in their significand. Said another way, subnormal numbers are smaller than the smallest normal number that can be represented in a floating-point format, where normal numbers are in the balanced range supported by the floating-point format.

Exemplary Floating-Point Circuitry

Figure 2:
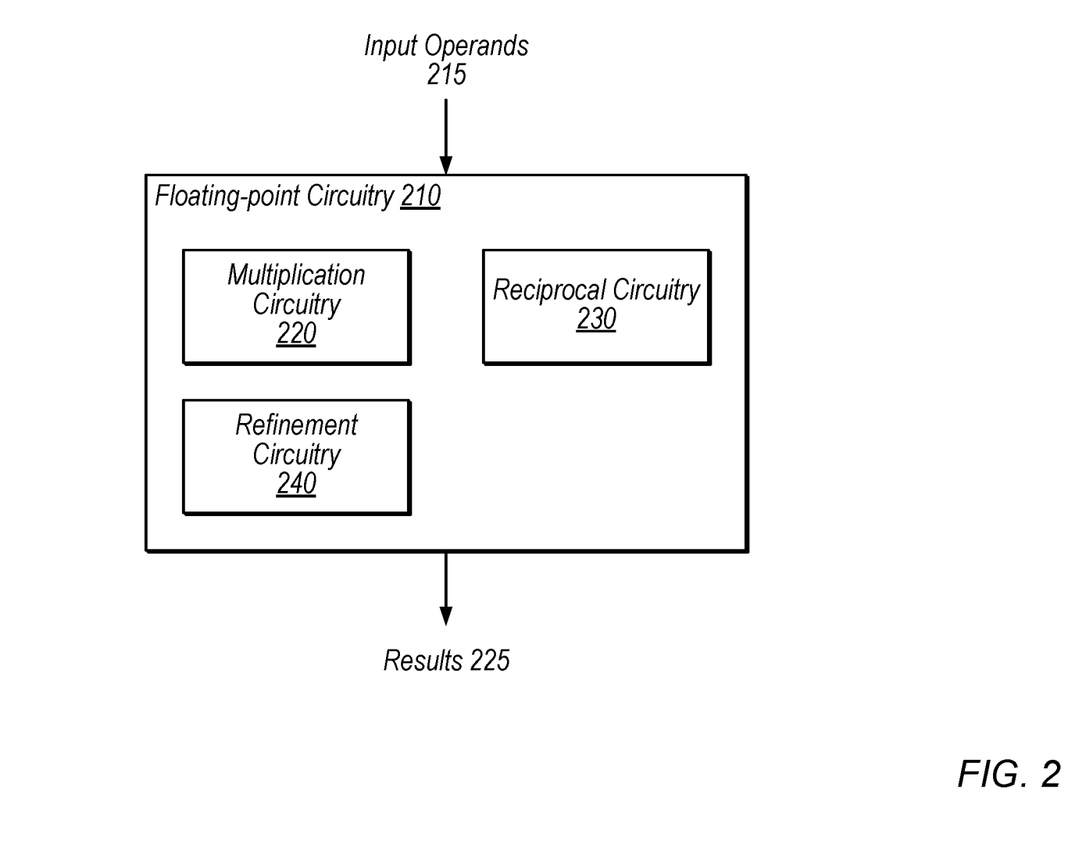
FIG. 2 is a diagram illustrating floating-point circuitry, according to some embodiments.

FIG. 2 is a block diagram illustrating exemplary floating-point circuitry, according to some embodiments. In the illustrated embodiment, floating-point circuitry 210 receives input operands 215 and generates results 225 using one or more of multiplication circuitry 220, reciprocal circuitry 230, and refinement circuitry 240. In some embodiments, multiplication circuitry 220 and reciprocal circuitry 230 are configured to perform operations at a greater precision than a lower precision supported by floating-point circuitry 210. For example, input operands 215 may include 16-bit operands and circuitry 220 and 230 may be configured to perform 32-bit operations.

In some embodiments, refinement circuitry 240 is configured, in concert with circuitry 220 and 230, to perform one or more refinements to generate correctly-rounded sub-normal results for reciprocal-based division. In some embodiments, the circuitry shown in FIG. 2 is configured to perform the operations discussed in detail below with reference to FIG. 3.

Exemplary Reciprocal Technique with Refinement for Subnormal Outputs

Figure 3:
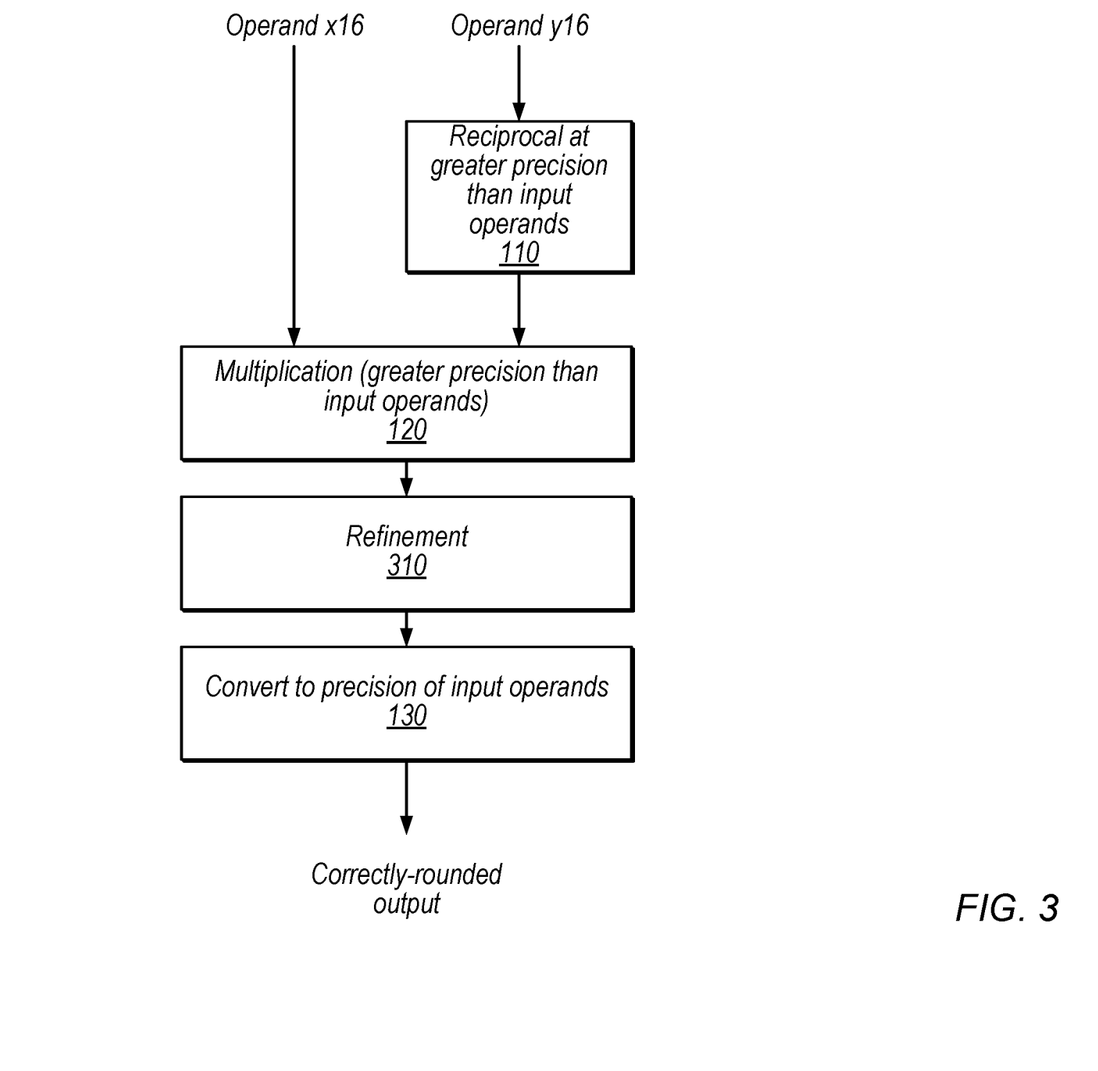
FIG. 3 is a diagram illustrating an exemplary technique for reciprocal-based floating-point division, with a refinement to correctly round subnormal outputs, according to some embodiments.

FIG. 3 is a diagram illustrating a process similar to that in FIG. 1, but with an added refinement element 310, according to some embodiments. Similarly numbered elements of FIGS. 1 and 3 may correspond to the same function. In some embodiments, the refinement 310 provides results with less error (or no error) for some subnormal outputs, relative to the technique of FIG. 1.

One example of a refinement that may be used at 310 is a Goldschmidt refinement. This may involve subtracting Y32 times R from X32, multiplying the result by Rcp32, and adding the result to R. R is then set to the result if the result is non-zero. For example, these operations may be indicated by the following pseudo-code.

t1=fma(-Y32, R, X32); // t1=X32-Y32*R
t2=fma(t1, Rcp32, R); // t2=R+t1*Rcp32
if (abs(t2)>0) {
  R=t2;
}

This refinement, however, requires a substantial number of instructions and may consume substantial power. Therefore, in other embodiments it may be advantageous to use a different refinement that reduces the number of operations/instructions without requiring excessive hardware area.

One example of such a refinement involves masking an integer representation of the multiplication result. In particular, in some embodiments, if both the reciprocal at 110 and the multiplication at 120 are correctly rounded, then if the multiplication result R is taken as a 32-bit integer, the following refinements may produce a correctly rounded division result, even for subnormal numbers. First, if a set of N least significant bits of the R (integer) have an integer value equal to 1 (i.e., none of the bits are set except for the least significant bit), then the least significant bit of the representation is set to zero. Second, if the set of N bits have a value of one less than a particular power of two (i.e. $2^N-1$, meaning that all of the N least significant bits are set to 1), then one is added to the integer representation. In some embodiments, these operations may be indicated by the following pseudo-code.

mask=($2^N-1$);
if ((R.uint32 & mask)==1) {
  R.uint32=R.uint32 & 0xfffffffe;
}
if ((R.uint32 & mask)==mask) {
  R.uint32=R.uint32+1;
}

Alternatively, the masking operation specified as R.uint32=R.uint32 & 0xfffffffe may be replaced with a subtraction by 1, e.g.:

R.uint32=R.uint32-1;

In some embodiments, these two refinements provide correctly rounded results for one or more particular values of N. For example, for 16-bit inputs and 32-bit reciprocal and multiply operations, the values 13, 14, 15, and 16 for N may provide correctly rounded results for sub-normal numbers. Further, relative to the Goldschmidt refinement discussed above, this refinement avoids multiplication operations, which may advantageously improve performance and/or reduce power consumption.

In some embodiments, the disclosed refinements may be indicated using a special instruction or a special indicator for an existing instruction (e.g., a multiplication instruction). For example, consider a mode for a multiplication instruction specified by the notation "f32mul.f16divstep" that implements the refinement operations discussed immediately above. In this case, the following code may be used for floating-point division:

X32=(float) x16;
Y32=(float) y16;
Rcp32=1.0f/Y32;
R=f32mul.f16divstep(X32, Rcp32);
r16=(half) R;

This may advantageously allow reciprocal-based floating-point division using a relatively small number of instructions.

In some embodiments, specialized reciprocal circuitry may further reduce the cost of refinements for reciprocal-based division. For example, if the reciprocal circuitry is configured to generate a skewed output distribution that is weighted greater than a correctly-rounded reciprocal function, then the increment half of the refinement discussed above may not be needed to achieve correctly-rounded subnormal results. Further, the condition check for clearing the LSB may not be needed. This may be the case if reciprocal circuitry configured to perform the 32-bit reciprocal function does not have a ULP error that is too large to obtain accurate 16-bit results for normal number outputs. In some embodiments, the reciprocal function may have the maximum ULP that still provides correct division results for normal number outputs. Further, in some embodiments, portions of the distribution with smaller results do not fall on a rounding boundary condition.

Therefore, in some embodiments with reciprocal circuitry with a non-correctly-rounded output distribution, the following code may be used for floating-point division:

X32=(float) x16;
Y32=(float) y16;
Rcp32=f32rcp(Y32); // not correctly rounded
R=X32*Rcp32; // correctly rounded
R.uint32=R.uint32 & 0xfffffffe;
r16=(half) R;

In some embodiments, this may advantageously facilitate accurate reciprocal-based floating-point division using a relatively small number of instructions, a small mask (e.g., potentially using a single-bit mask in hardware), and a small impact on circuit area.

In some embodiments, reciprocal circuitry configured to generate an incorrectly-rounded result may be dedicated for use for reciprocal-based division. In other embodiments, it may also be used to generate reciprocals for other operations. [In some embodiments, similar techniques may be used with a skewed reciprocal function with an output distribution having smaller results than a correctly-rounded distribution. In these embodiments, the refinement circuitry may be configured to always add a 1 to the integer representation of the multiplication output, for example.

Exemplary Method

Figure 4:
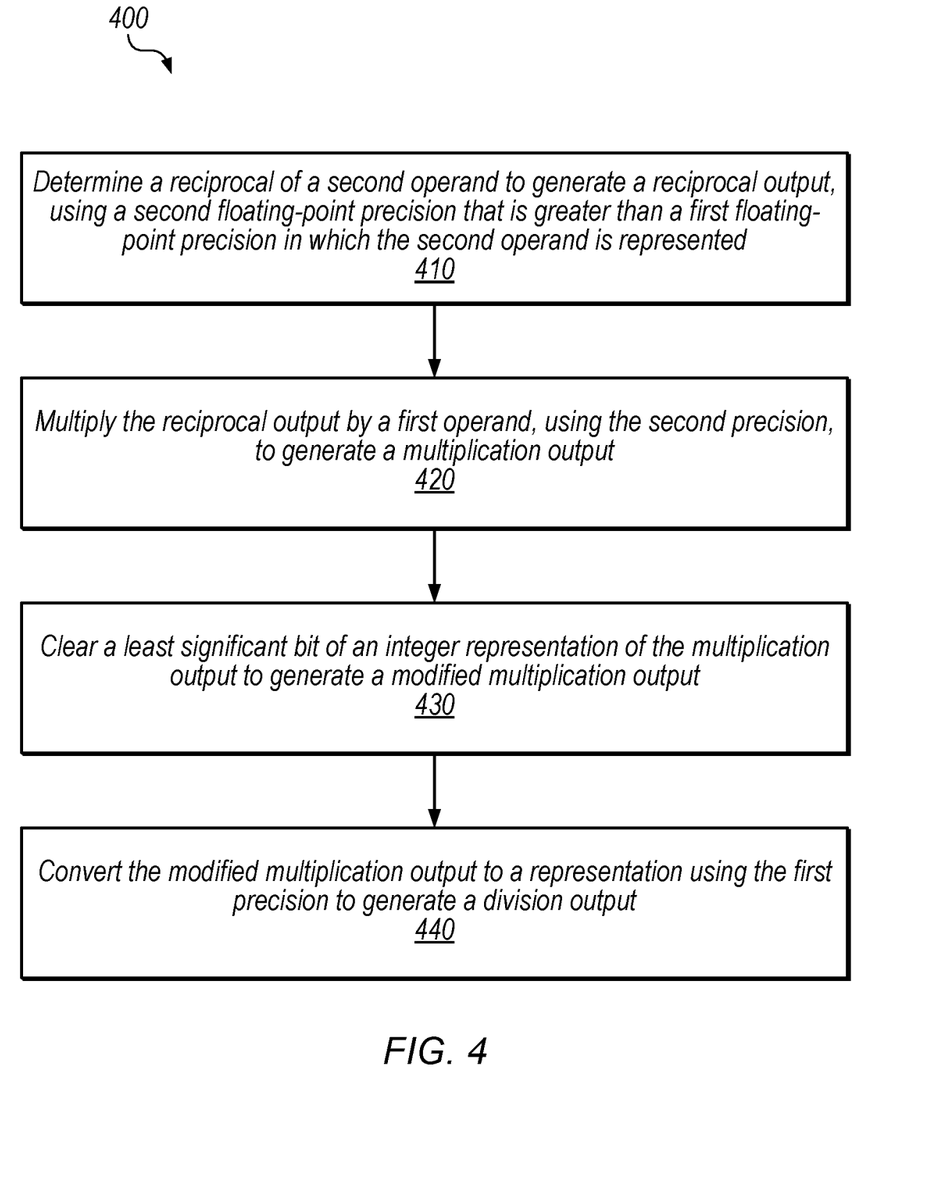
FIG. 4 is a flow diagram illustrating an exemplary method, according to some embodiments.

FIG. 4 is a flow diagram illustrating a method 400 for performing reciprocal-based floating-point division, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

In some embodiments, the method of FIG. 4 includes performing a floating-point operation to divide a first operand (e.g., a dividend) by a second operand (e.g., a divisor), where the first and second operands are represented using a first precision (e.g., a 16-bit precision).

At 410, in the illustrated embodiment, circuitry (e.g., reciprocal circuitry 230) determines a reciprocal of the second operand to generate a reciprocal output, using a second precision that is greater than the first precision (e.g., a 32-bit precision). In some embodiments, the reciprocal circuitry is configured to generate a skewed output distribution that is greater than a correctly-rounded reciprocal function. In other embodiments, the reciprocal output may be correctly rounded.

At 420, in the illustrated embodiment, circuitry (e.g., multiplication circuitry 220) multiplies the reciprocal output by the first operand, using the second precision, to generate a multiplication output.

At 430, in the illustrated embodiment, circuitry (e.g., refinement circuitry 240) clears a least significant bit of an integer representation of the multiplication output to generate a modified multiplication output. The clearing the LSB may be performed using a mask or by subtracting a 1 from the value, for example. In some embodiments, the integer representation uses the same number of bits as the second floating-point precision. Note that the terms "setting" and "clearing" herein are used to refer to causing a bit to exhibit a logical "1" or a logical "0" respectively. The actual voltage values used to represent these logical values may vary, however, and may have different polarities in different embodiments.

At 440, in the illustrated embodiment, circuitry converts the modified multiplication output to a representation using the first precision to generate a division output. In some embodiments, the division output is a subnormal number that is correctly rounded.

In some embodiments, the clearing the LSB is always performed, e.g., when using a dedicated reciprocal circuit with a skewed output distribution. In some embodiments, the floating-point circuitry determines whether to clear the bit based on whether a value of a particular set of bits of the integer representation of the multiplication output is equal to one. This set of bits may be determined using a mask that is an integer representation of one less than a power of two, for example.

In some embodiments, the floating-point circuitry is configured to add a value of 1 to the multiplication output, under certain conditions. For example, in some embodiments, in response to determining that a value of the particular set of bits of the modified multiplication output matches a particular value, the floating point circuitry adds 1 to the integer representation of the multiplication output instead of clearing the least significant bit. In some embodiments, the particular set of bits is determined using a mask that is an integer representation of one less than a power of two and the predetermined value is the value of the mask.

In some embodiments, the apparatus is configured to determine whether to clear the bit based on a single instruction (e.g., the f32mul.f16divstep instruction). In some embodiments, the apparatus is configured to execute a multiplication instruction that indicates to generate the integer representation of the multiplication output and clear the least significant bit.

Exemplary Device

Figure 5:
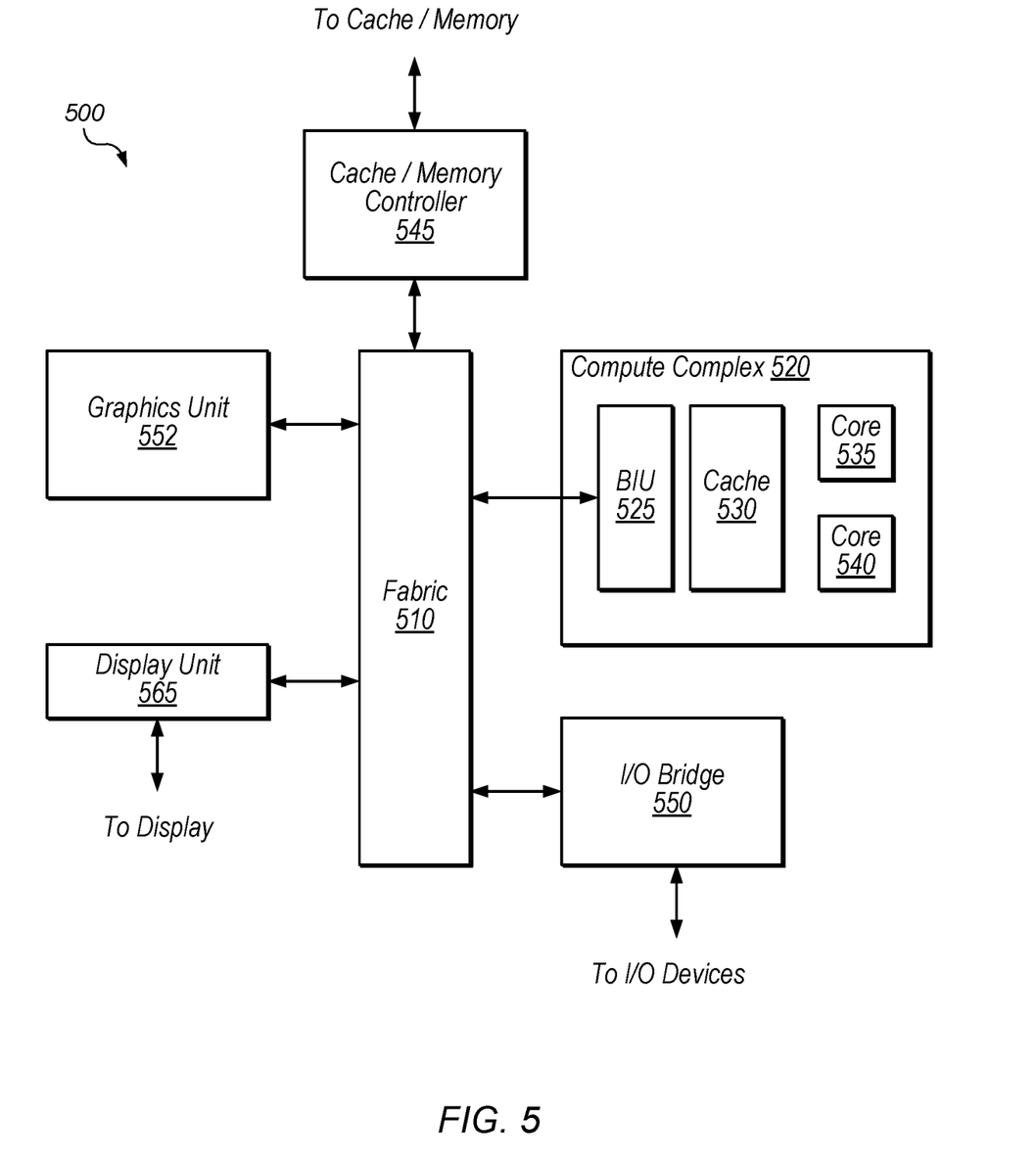
FIG. 5 is a block diagram illustrating an exemplary device, according to some embodiments.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 552, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 552 may be described as "coupled to" a memory through fabric 510 and cache/memory controller 545. In contrast, in the illustrated embodiment of FIG. 5, graphics unit 552 is "directly coupled" to fabric 510 because there are no intervening elements.

Graphics unit 552 may include one or more processors and/or one or more graphics processing units (GPU's). Graphics unit 552 may receive graphics-oriented instructions, such as OPENGL®, Metal, or DIRECT3D® instructions, for example. Graphics unit 552 may execute specialized GPU instructions or perform other operations based on the received graphics-oriented instructions. Graphics unit 552 may generally be configured to process large blocks of data in parallel and may build images in a frame buffer for output to a display. Graphics unit 552 may include transform, lighting, triangle, and/or rendering engines in one or more graphics processing pipelines. Graphics unit 552 may output pixel information for display images.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Exemplary Computer-Readable Storage Medium

Figure 6:
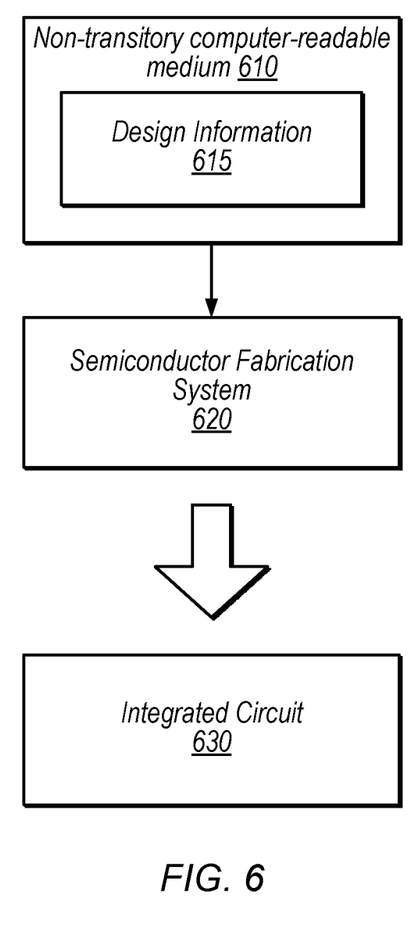
FIG. 6 is a diagram illustrating an exemplary computer-readable medium that stores design information, according to some embodiments.

FIG. 6 is a block diagram illustrating an exemplary non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable medium 610, may comprise any of various appropriate types of memory devices or storage devices. Medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 610 may include other types of non-transitory memory as well or combinations thereof. Medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabrication at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIG. 2 or 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
floating-point circuitry configured to perform a floating-point operation to divide a first operand by a second operand, wherein the first and second operands are represented using a first floating-point precision, including:
reciprocal circuitry configured to determine a reciprocal of the second operand to generate a reciprocal output, using a second floating-point precision that is greater than the first precision;
multiplication circuitry configured to multiply the reciprocal output by the first operand, using the second precision, to generate a multiplication output;
circuitry configured to clear a least significant bit of an integer representation of the multiplication output to generate a modified multiplication output; and
circuitry configured to convert the modified multiplication output to a representation using the first precision to generate a division output.

2. The apparatus of claim 1, wherein the floating-point circuitry is configured to:
determine whether to clear the bit based on whether a value of a predetermined set of bits of the integer representation of the multiplication output is equal to one.

3. The apparatus of claim 2, wherein the predetermined set of bits is determined using a mask that is an integer representation of one less than a power of two.

4. The apparatus of claim 1, wherein the floating-point circuitry is configured to:
in response to determining that a value of a particular set of bits of the modified multiplication output matches a predetermined value, add a value of one to the integer representation of the multiplication output instead of clearing the bit.

5. The apparatus of claim 4, wherein the particular set of bits is determined using a mask that is an integer representation of one less than a power of two and wherein the predetermined value is the value of the mask.

6. The apparatus of claim 1, wherein the apparatus is configured to determine whether to clear the bit based on a single instruction.

7. The apparatus of claim 1, wherein the first precision is a 16-bit precision and the second precision is a 32-bit precision.

8. The apparatus of claim 1, wherein the reciprocal circuitry is configured to generate a skewed output distribution that is greater than a correctly-rounded reciprocal function.

9. The apparatus of claim 1, wherein the apparatus is configured to execute a multiplication instruction that indicates to generate the integer representation of the multiplication output and clear the least significant bit.

10. A method, comprising:
performing a floating-point operation to divide a first operand by a second operand, wherein the first and second operands are represented using a first precision, including:
determining a reciprocal of the second operand to generate a reciprocal output, using a second precision that is greater than the first precision;
multiplying the reciprocal output by the first operand, using the second precision, to generate a multiplication output;
clearing a least significant bit of an integer representation of the multiplication output to generate a modified multiplication output; and
converting the modified multiplication output to a representation using the first precision to generate a division output.

11. The method of claim 10, further comprising:
determining whether to clear the bit based on whether a value of a particular set of bits of the integer representation of the multiplication output is equal to one.

12. The method of claim 10, further comprising:
determining to perform the clearing based on a single instruction.

13. The method of claim 10, wherein the determining the reciprocal is performed according to a reciprocal function that generates a skewed output distribution that is greater than a correctly-rounded reciprocal function.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:
floating-point circuitry configured to perform a floating-point operation to divide a first operand by a second operand, wherein the first and second operands are represented using a first precision, including:
reciprocal circuitry configured to determine a reciprocal of the second operand to generate a reciprocal output, using a second precision that is greater than the first precision;
multiplication circuitry configured to multiply the reciprocal output by the first operand, using the second precision, to generate a multiplication output;
circuitry configured to clear a least significant bit of an integer representation of the multiplication output to generate a modified multiplication output; and
circuitry configured to convert the modified multiplication output to a representation using the first precision to generate a division output.

15. The non-transitory computer readable storage medium of claim 14, wherein the floating-point circuitry is configured to:
determine whether to clear the bit based on whether a value of a particular set of bits of the integer representation of the multiplication output is equal to one.

16. The non-transitory computer readable storage medium of claim 15, wherein the particular set of bits is determined using a mask that is an integer representation of one less than a power of two.

17. The non-transitory computer readable storage medium of claim 14, wherein the floating-point circuitry is configured to:
in response to determining that a value of a particular set of bits of the modified multiplication output matches a particular value, add a value of one to the integer representation of the multiplication output instead of clearing the bit.

18. The non-transitory computer readable storage medium of claim 17, wherein the particular set of bits is determined using a mask that is an integer representation of one less than a power of two and wherein the particular value is the value of the mask.

19. The non-transitory computer readable storage medium of claim 14, wherein the reciprocal circuitry is configured to generate a skewed output distribution that is greater than a correctly-rounded reciprocal function.

20. The non-transitory computer readable storage medium of claim 14, wherein the circuit is configured to execute a multiplication instruction that indicates to generate the integer representation of the multiplication output and clear the least significant bit.

* * * * *